United States Patent
Bonhote et al.

(10) Patent No.: US 8,230,582 B2
(45) Date of Patent: Jul. 31, 2012

(54) METHODS OF MAKING MAGNETIC WRITE HEADS WITH USE OF A RESIST CHANNEL SHRINKING SOLUTION HAVING CORROSION INHIBITORS

(75) Inventors: Christian Rene Bonhote, San Jose, CA (US); Jila Tabib, Los Gatos, CA (US); Dennis Richard Mckean, Milpitas, CA (US); Daniel Wayne Bedell, Gilroy, CA (US); Jyh-Shuey Lo, San Jose, CA (US); Heiu Lam, Milpitas, CA (US); Kim Y Lee, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 228 days.

(21) Appl. No.: 12/685,455

(22) Filed: Jan. 11, 2010

(65) Prior Publication Data

US 2010/0107402 A1    May 6, 2010

Related U.S. Application Data

(63) Continuation of application No. 11/312,064, filed on Dec. 19, 2005, now abandoned, which is a continuation-in-part of application No. 10/881,782, filed on Jun. 30, 2004, now Pat. No. 7,343,666.

(51) Int. Cl.
*G11B 5/127*    (2006.01)
*H04R 31/00*    (2006.01)

(52) U.S. Cl. ............... 29/603.11; 29/603.13; 29/603.14; 29/603.16; 29/603.18; 205/199; 205/122; 360/121; 360/122; 360/317

(58) Field of Classification Search ............... 29/607.07, 29/603.13–603.16, 603.18; 205/119, 122; 360/121, 122, 317

See application file for complete search history.

(56) References Cited

U.S. PATENT DOCUMENTS 3,249,572 A    5/1966    Davis et al.
3,488,246 A    1/1970    Duggins
(Continued)

FOREIGN PATENT DOCUMENTS

EP    1223470 A1    7/2002
(Continued)

OTHER PUBLICATIONS

Mamoru Terai, Advanced RELACS Technology for ArF Resist, Journal of Photopolymer Science and Technology, 2003, pp. 507-510, vol. 16, No. 4.

(Continued)

*Primary Examiner* — Paul D Kim
(74) *Attorney, Agent, or Firm* — John J. Oskorep, Esq.; Darren Gold

(57) ABSTRACT

One preferred method for use in making a device structure with use of the resist channel shrinking solution includes the steps of forming a first pedestal portion within a channel of a patterned resist; applying a resist channel shrinking solution comprising a resist channel shrinking film and corrosion inhibitors within the channel of the patterned resist; baking the resist channel shrinking solution over the patterned resist to thereby reduce a width of the channel of the patterned resist; removing the resist channel shrinking solution; and forming a second pedestal portion within the reduced-width channel of the patterned resist. Advantageously, the oxide layer and the corrosion inhibitors of the resist channel shrinking solution reduce corrosion in the pedestal during the act of baking the resist channel shrinking solution.

16 Claims, 12 Drawing Sheets

U.S. PATENT DOCUMENTS

| | | | |
|---|---|---|---|
| 5,096,802 | A | 3/1992 | Hu |
| 5,285,340 | A | 2/1994 | Ju et al. |
| 5,652,687 | A | 7/1997 | Chen et al. |
| 5,802,700 | A | 9/1998 | Chen et al. |
| 5,976,769 | A | 11/1999 | Chapman |
| 6,117,622 | A | 9/2000 | Eisele et al. |
| 6,187,486 | B1 | 2/2001 | Lai et al. |
| 6,291,138 | B1 | 9/2001 | Wu et al. |
| 6,503,693 | B1 | 1/2003 | Mohondro et al. |
| 6,511,794 | B1 | 1/2003 | Furukawa |
| 6,514,663 | B1 | 2/2003 | Hien et al. |
| 6,534,243 | B1 | 3/2003 | Templeton et al. |
| 6,566,041 | B2 | 5/2003 | Iwasaki et al. |
| 6,635,408 | B2 | 10/2003 | Kamijima |
| 6,641,984 | B2 | 11/2003 | Kamijima |
| 6,663,761 | B2 | 12/2003 | Kamijima |
| 6,960,627 | B2 | 11/2005 | Huth et al. |
| 7,343,666 | B2 * | 3/2008 | Lee et al. .................... 29/603.16 |
| 2001/0007732 | A1 | 7/2001 | Iwasaki et al. |
| 2002/0088533 | A1 * | 7/2002 | Mercure et al. ............... 156/179 |
| 2003/0104290 | A1 | 6/2003 | Iwasaki et al. |
| 2003/0143489 | A1 | 7/2003 | Kong et al. |
| 2003/0157801 | A1 | 8/2003 | Kozawa et al. |
| 2004/0020778 | A1 | 2/2004 | Lin et al. |
| 2004/0096780 | A1 | 5/2004 | Nozaki et al. |
| 2007/0298234 | A1 | 12/2007 | Oono et al. |

FOREIGN PATENT DOCUMENTS

| | | |
|---|---|---|
| JP | 62095712 | 5/1987 |
| JP | 2105307 A | 4/1990 |
| JP | 6148661 A | 5/1994 |
| JP | 10269521 A | 10/1998 |
| JP | 11039618 A | 2/1999 |
| JP | 11071688 | 3/1999 |
| RU | 2042456 C1 | 8/1995 |

OTHER PUBLICATIONS

Warren H. Philipp and Li-Chen Hsu, Three Methods for In Situ Cross-Linking of Polyvinyl Alcohol Films for Application As Ion-Conducting Membranes in Potassium Hydroxide Electrolyte, NASA Technical Paper 1407, Apr. 1979, pp. 1-15.

* cited by examiner

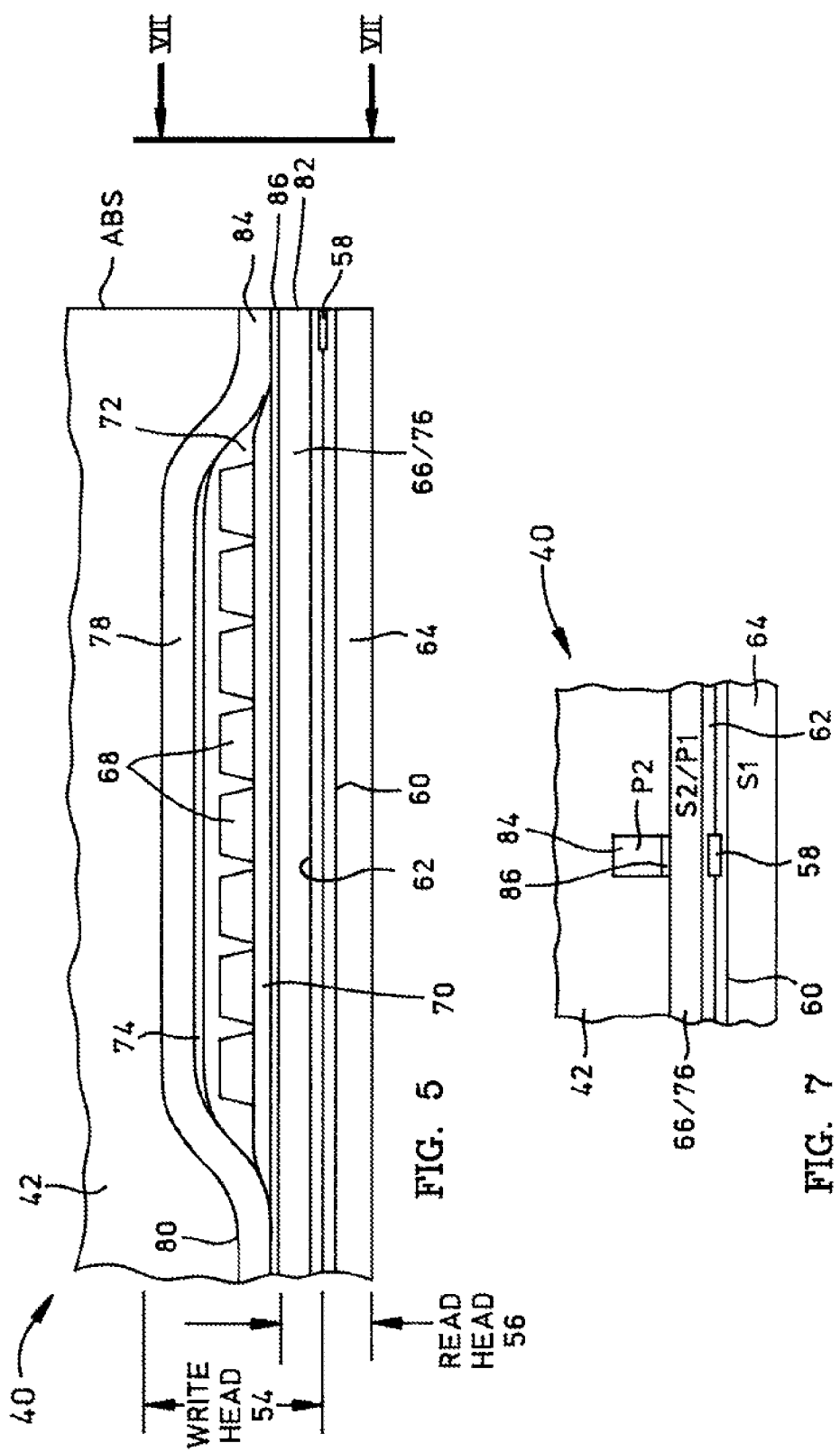

Plate First Pole Piece Layer And
Form Gap Layer

Form Patterned Resist

Plate P2 Portion and
Form Oxide Layer

Apply Resist Channel Shrinking Solution
Having Corrosion Inhibitors Over Structure Ion Mill Pedestal To Form
Notched Pedestal Deposit Insulator Material

METHODS OF MAKING MAGNETIC WRITE HEADS WITH USE OF A RESIST CHANNEL SHRINKING SOLUTION HAVING CORROSION INHIBITORS

CROSS-REFERENCE TO RELATED APPLICATIONS

This patent application is a continuation of and claims priority to U.S. non-provisional patent application having application Ser. No. 11/312,064 and filing date of 19 Dec. 2005, now abandoned, which is a continuation-in-part of application Ser. No. 10/881,782 having a filing date of 30 Jun. 2004, now U.S. Pat. No. 7,343,666, each application hereby incorporated by reference herein.

BACKGROUND

1. Field of the Technology

This present application relates generally to magnetic heads in disk drives, and more particularly to improved methods of making magnetic write heads based on linewidth shrinkage techniques using a resist channel shrinking solution having corrosion inhibitors.

2. Description of the Related Art

A write head is typically combined with a magnetoresistive (MR) read head to form a merged MR head, certain elements of which are exposed at an air bearing surface (ABS). The write head comprises first and second pole pieces connected at a back gap that is recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR read head.

An MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic fields from the circular tracks of the rotating disk by a change in to resistance that corresponds to the strength of the fields. A sense current is conducted through the MR sensor, where changes in resistance cause voltage changes that are received by the processing circuitry as readback signals.

One or more merged MR heads may be employed in a magnetic disk drive for reading and writing information on circular tracks of a rotating disk. A merged MR head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk. Flying heights are typically on the order of about 0.01 µm.

The second pole, along with its second pole tip, is frameplated on top of the gap layer. After depositing a seed layer on the gap layer, a photoresist layer is spun on the seed layer, imaged with light, and developed to provide an opening surrounded by a resist wall for electroplating the second pole piece and second pole tip. To produce a second pole tip with a narrow track width, the photoresist layer has to be correspondingly thin. Once the second pole tip is formed, it is desirable to notch the first pole piece opposite the first and second bottom corners of the second pole tip. Notching the first pole piece minimizes side writing in tracks written on the magnetic disk. As is known, when the tracks are overwritten by side writing the track density of the magnetic disk is reduced. When the first pole piece is notched, it has first and second side walls that are aligned with first and second side walls of the second pole tip, so that the first pole piece and the second pole tip have the same track width at the ABS. This minimizes fringing of magnetic fields from the second pole tip laterally beyond the track width (side writing) to a wide expanse of the first pole piece.

A prior art process for notching the first pole piece entails ion beam milling the gap layer and the first pole piece, employing the second pole tip as a mask. According to this prior art process as typified in U.S. Pat. Nos. 5,452,164 and 5,438,747, the gap layer is typically alumina and the first and second pole pieces and pole tips are typically Permalloy (NiFe). Alumina mills more slowly than Permalloy; thus the top of second pole tip and a top surface of the first pole piece are milled more quickly than the gap layer. Further, during ion milling there is significant redeposition of alumina on surfaces of the workpiece. The milling ion beam is typically directed at an angle with respect to a normal to the layers, in order that milling and clean-up be done subsequently or simultaneously.

Notching the first pole piece is very time consuming due, in part, to shadowing of the notch sites by the angled milling and by the profile of the second pole tip, as the wafer supporting the magnetic head is rotated. The length of milling time is due more, however, to the large lateral expanse of the first pole piece. Since the top and side walls of the second pole tip are also milled while the first pole piece is being notched, the second pole tip has to be formed with extra thickness and width so that, after notching is completed, the second pole tip is at its target height and target track width. Unfortunately, because of the long time required for notching it is difficult to meet the targets within acceptable tolerances. This lowers the manufacturing yield.

In order to minimize overmilling of the first pole piece, another process removes the gap layer—except for a desired portion between the first and second pole tips—using a wet-etchant or reactive ion mill. After the unwanted portions of the gap layer are removed, the first pole piece is ion milled employing the second pole tip as a mask. This process eliminates significant redeposition of the alumina. A problem with this process, however, is that the etching undercuts the gap layer under the base of the second pole tip, which is a critical area for the transfer of field signals. The undercut regions provide spaces where Permalloy can be redeposited during subsequent ion milling of the first pole piece, or other foreign material can be redeposited upon subsequent milling and clean-up steps. Further, if the track width of the second pole tip is in the order of 1 µm, the etchant may release the second pole tip from the gap layer, thus ruining the head.

In U.S. Patent Publication No. US 2003/0179498 A1 entitled "Magnetic Head to Having A Notched Pole Piece Structure And Method Of Making The Same" by Hsiao et al., an alternative method of forming a notched pole piece structure is described. This method involves ion milling a first pole piece pedestal formed over a first pole piece layer using the second pole piece as a mask so that the pedestal is formed with angled side walls. The notching is performed after the ion milling of insulator materials (alumina) which surround the pedestal. Using this method, the notching is dependent on redeposited alumina material and can be difficult to control. A patterned resist is formed for the second pole piece using photolithography and second pole piece materials are electroplated within the patterned resist. Here, the second pole piece and notched pedestal may not be properly aligned or centered, especially for narrower trackwidths (e.g. less than 1 micron).

If the notched pedestal is appropriately formed and substantially symmetric, the magnetic head has suitable overwrite (OW) properties and little if any adjacent track interference (ATI) problems. If the second pole piece is not precisely centered relative the pedestal, the pedestal is formed to be asymmetric by the notching process which may cause undesirable ATI.

In the cross-referenced patent application having a U.S. patent application Ser. No. 10/881,782 filed on 30 Jun. 2004 entitled "Methods Of Making Magnetic Write Heads With Use of Linewidth Shrinkage Techniques", methods of making improved magnetic heads using linewidth shrinking techniques are disclosed. This improvement results in the second pole piece being substantially centered over the pedestal and the pedestal being symmetrically notched. During a baking process of the aqueous resist shrinking film, however, corrosion of the metallic layers may occur. This corrosion may hinder plating processes using high magnetic moment materials (e.g. $Ni_{22}Fe_{78}$) while forming the second pole piece. High magnetic moment materials are desirable for use in magnetic write heads.

What are needed are improved methods to make such magnetic heads so as to overcome the deficiencies of the previous techniques.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and magnetic head as seen in plane V-V of FIG. 2;

FIG. 7 is a partial ABS view of the slider taken along plane of FIG. 5 to show the read and write elements of the magnetic head;

DETAILED DESCRIPTION OF THE PREFERRED EMBODIMENTS

Methods of making magnetic heads based on linewidth shrinkage techniques with use of a resist channel shrinking solution are described herein. The resist channel shrinking solution of the present application is made of a resist channel shrinking film and corrosion inhibitors. One preferred method for use in making the magnetic head includes the steps of forming a first pole piece layer of a first pole piece; forming a gap layer over the first pole piece layer; forming a patterned resist over the first pole piece layer and the gap layer; electroplating a first pedestal portion of a second pole piece over the gap layer within a channel of the patterned resist; applying the resist channel shrinking solution over the patterned resist; baking the resist channel shrinking solution over the patterned resist to thereby reduce a width of the channel; removing the resist channel shrinking solution; electroplating a second pedestal portion of the second pole piece within the reduced-width channel of the patterned resist; and removing the patterned resist. A step of forming an oxide layer over the first pedestal portion may be performed prior to the step of baking. Advantageously, the reduction in channel width using a resist channel shrinking solution provides for self-alignment of a structure which can be symmetrically notched for improved overwrite (OW) properties and reduced adjacent track interference (ATI). The corrosion inhibitors of the resist channel shrinking solution help reduce corrosion in the pole piece during the act of baking the resist channel shrinking solution. The corrosion inhibitors of the solution may be based on, for example, an azole (e.g. 1-2-3-Benzotriazole or BTA) and comprise 0.4-1.5% of the solution by weight. Advantageously, high magnetic moment materials may be utilized in the magnetic write head as desired.

The following description is the best embodiment presently contemplated for carrying out the present invention. This description is made for the purpose of illustrating the general principles of the present invention and is not meant to limit the inventive concepts claimed herein.

Figure 1:
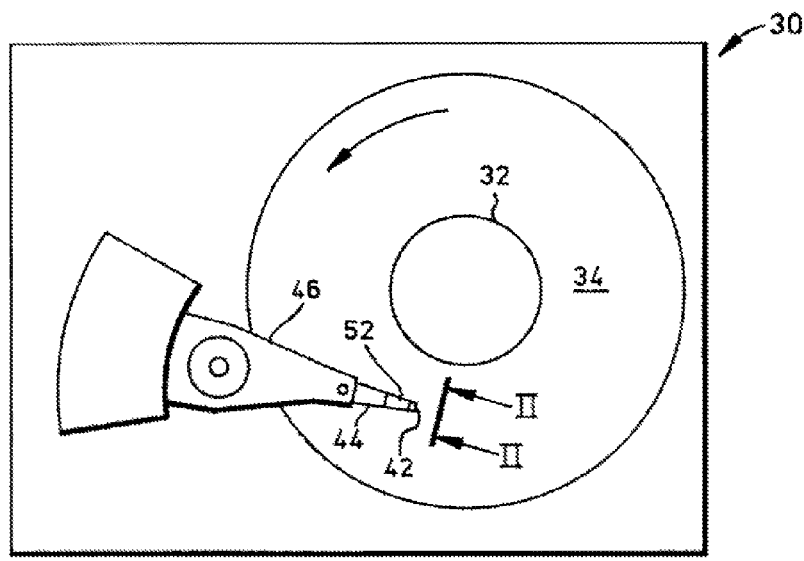
FIG. 1 is a planar view of an exemplary magnetic disk drive.
Figure 2:
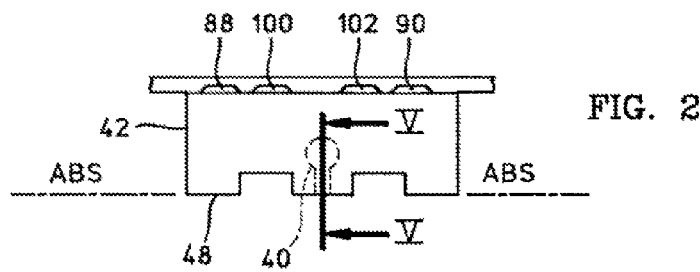
FIG. 2 is an end view of a slider with a magnetic head of the disk drive as seen in plane II-II.
Figure 3:
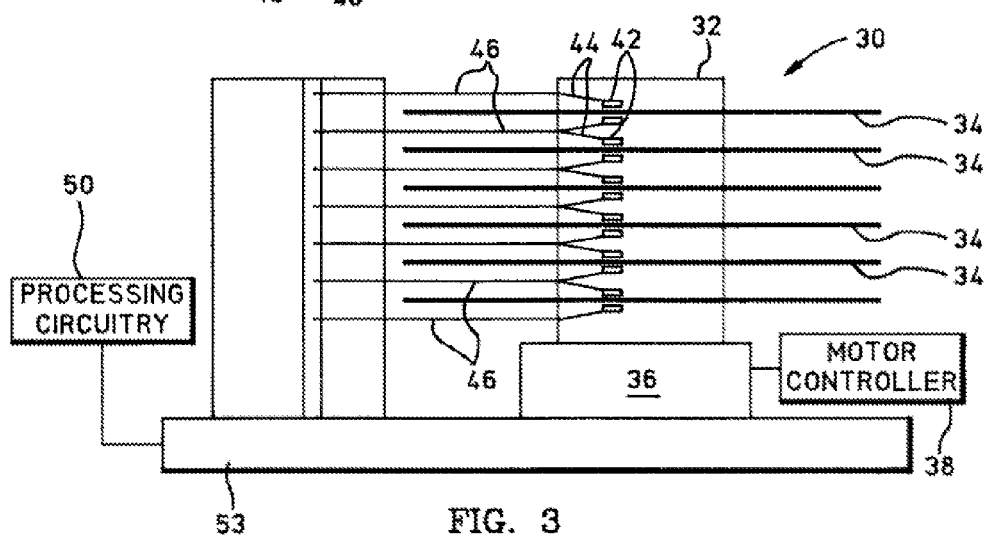
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1-3 a magnetic disk drive 30. Disk drive 30 includes a spindle 32 that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by motor 36, the slider is supported on a thin (typically, 0.05 µm) cushion of air (air bearing) between the disk and an air bearing surface (ABS) 48.

Figure 4:
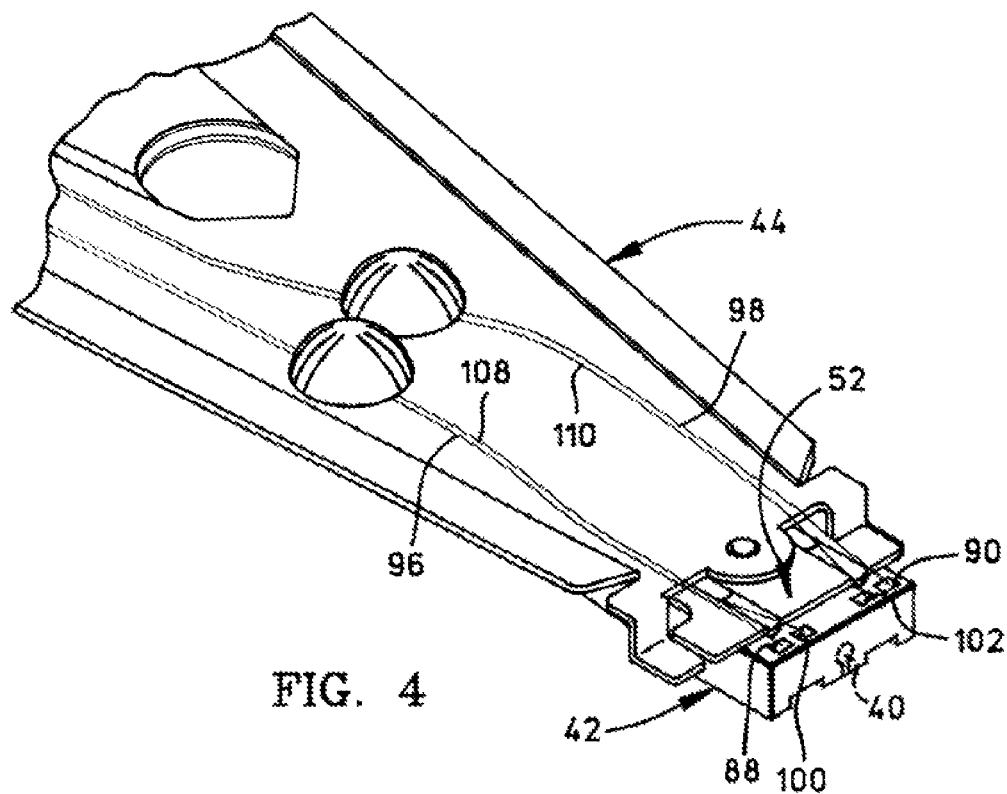
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with magnetic head 40, provides motor drive signals, and also provides control signals for moving slider 42 to various tracks. In FIGS. 1 and 4, slider 42 is shown mounted to a head gimbal assembly (HGA) 52 that is mounted to the suspension 44. All of the above components are supported on a base 53.

FIG. 5 is a side cross-sectional elevation view of a merged magnetoresistive (MR) head 40, with a write head portion 54 and a read head portion 56. Read head portion 56 includes an MR sensor 58. MR sensor 58 is sandwiched between first and second gap layers 60 and 62 that are, in turn, sandwiched between first and second shield layers 64 and 66. In response to external magnetic fields, the resistance of MR sensor 58 changes. A sense current conducted through the sensor causes these resistance changes to be manifested as potential changes, which are processed by processing circuitry 50 shown in FIG. 3.

Figure 6:
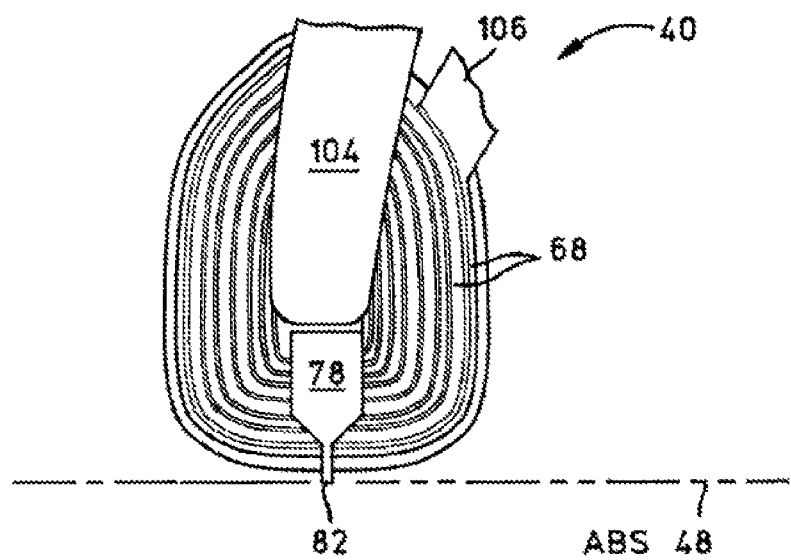
FIG. 6 is a top view of the second pole piece and coil layer, a portion of which is shown in FIG. 5, with all insulation material removed.

Write head portion 54 of the head includes a coil layer 68 sandwiched between first and second insulation layers 70 and 72. A third insulation layer 74 may be employed for planarizing the head to eliminate ripples in the second insulation layer caused by the coil layer 68. First, second and third insulation layers are referred to as an "insulation stack". Coil layer 68, and first, second and third insulation layers 70, 72 and 74, are sandwiched between first and second pole piece layers 76 and 78. First and second pole piece layers 76 and 78 are magnetically coupled at a back gap 80, and have first and second pole tips 82 and 84 that are separated by a non-magnetic gap layer 86 at the ABS. As shown in FIGS. 2 and 4, first and second solder connections 88 and 90 connect leads (not shown) from MR sensor 58 to leads 96 and 98 on suspension 44; third and fourth solder connections 100 and 102 connect leads 104 and 106 from coil 68 (see FIG. 6) to leads 108 and 110 on suspension 44.

Figure 8:
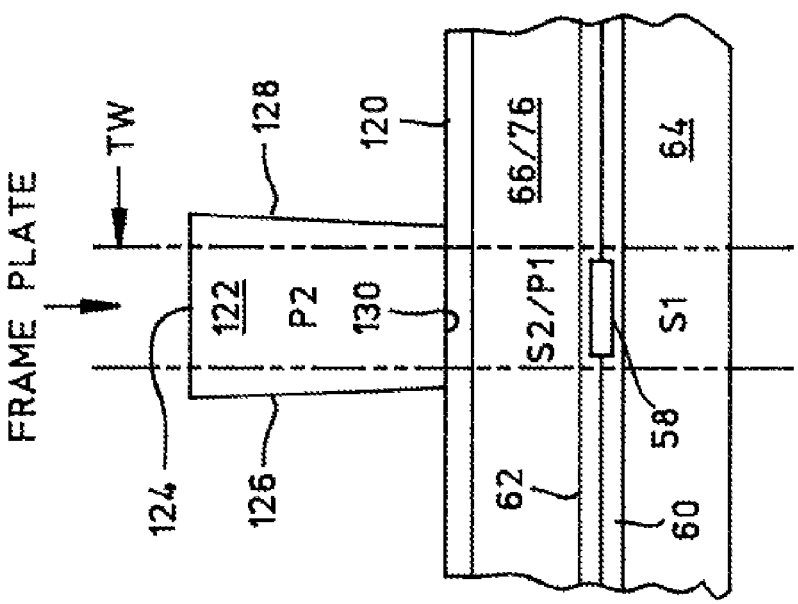
FIG. 8 is an ABS of a prior art head prior to notching the first pole piece.

FIG. 8 shows an ABS view of a prior art merged magnetic head, in which the second shield of the read head and the first pole piece of the write head are a common layer 66/76. Gap layer 120 has been formed on first pole piece layer 66/76, followed by frame plating a second pole tip 122 on gap layer 120. Second pole tip 122 is a front portion of the second pole piece. The second pole tip is bounded by a top 124, first and second side walls 126 and 128, and a base 130. The target track width (TW) is shown in FIG. 8. Since the first pole piece will be notched by ion milling, second pole tip 122 is larger than a target size track width (TW) of the second pole tip, so as to allow for consumption of the second pole tip during a subsequent milling cycle. Accordingly, before milling, first and second side walls 126 and 128 extend beyond the track width, and top 124 is higher than the target height. The dimensions of these sacrificial portions is referred to in the art as windage.

Figure 9:
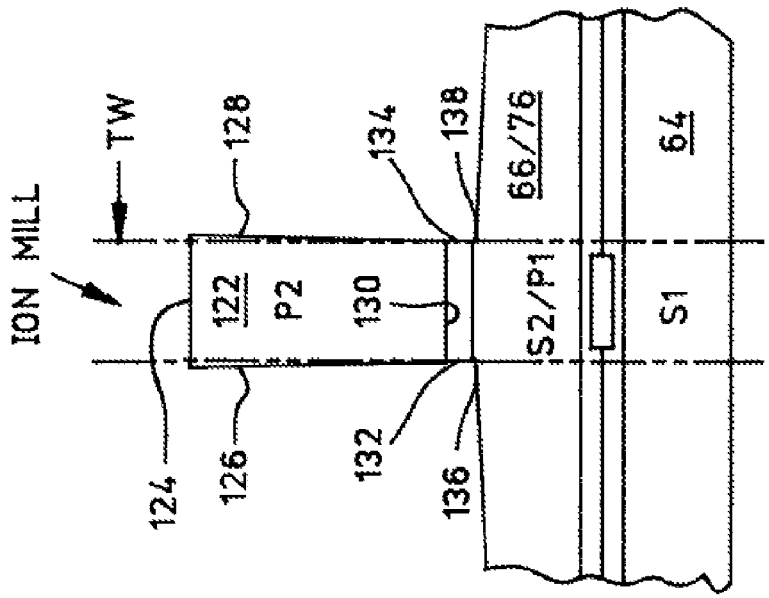
FIG. 9 is an ABS view of the prior art head of FIG. 8 after the first pole piece is formed with notches by milling.

In FIG. 9 ion milling is employed to mill through the gap layer to form a write gap 130 with first and second side walls 132 and 134, and to mill notches into the first pole piece 66/76 with first and second side walls 136 and 138. After milling, first side walls 126, 132 and 136 are contiguous, and second side walls 128, 134 and 138 are contiguous. This notching improves the transfer of flux between second pole tip 122 and first pole piece 66/76, since the flux will transfer to the pedestal portion of the first pole piece instead of the larger expanse thereof. This reduces side writing by the write head. The milling is at an angle to a normal to layers 66/76 and 64 in order to minimize redeposition of the milled material. It should be understood that the partially completed magnetic head in FIG. 9 rests upon a substrate (not shown) that is rotated during the milling cycle. The second pole tip is employed as a mask for forming write gap 130 and notching first pole piece at 136 and 138. It can be seen that this causes shadowing at notching sites 136 and 138 during approximately 180 degrees of the rotation, due to the angle of the milling. This shadowing increases the processing time required to form the notches in the first pole piece. It should be noted that the downward sloping portions of first pole piece layer 62 in FIG. 9 are formed due to the shadowing by second pole tip 122.

After milling, second pole tip 122 has been reduced in size. With the prior art method it is very difficult to reduce second pole tip 122 to the target track width and the target height because of the significant time required for milling the large lateral expanse of first pole tip 66/76. Milling of flat surfaces is very time-consuming as compared to side walls. Further, top 124 in FIG. 8 requires extra height because of the long time required for milling. This extra height increases the aspect ratio (ratio between height of resist employed to frame plate the second pole tip 122 and the target track width), which reduces the line width control capability of the second pole tip. Prior art methods of notching the first pole piece discussed in commonly assigned U.S. Pat. Nos. 5,438,747 and 5,452,164 indicate a strong-felt need to achieve self-aligned pole tips and to reduce the time required for notching.

Figure 10:
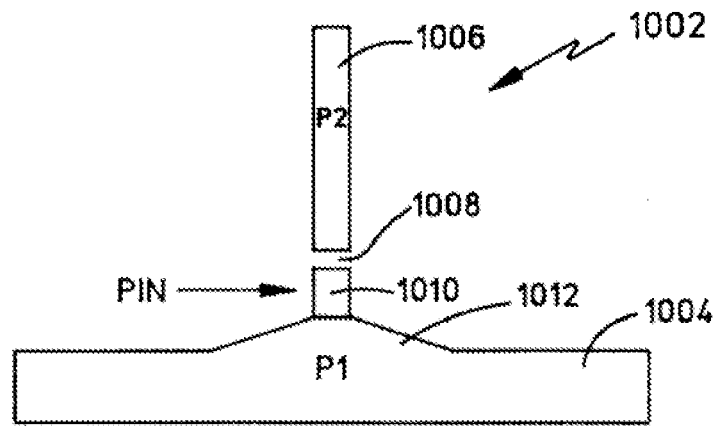
FIG. 10 is an ABS view of another prior art head formed with notches.
Figure 11:
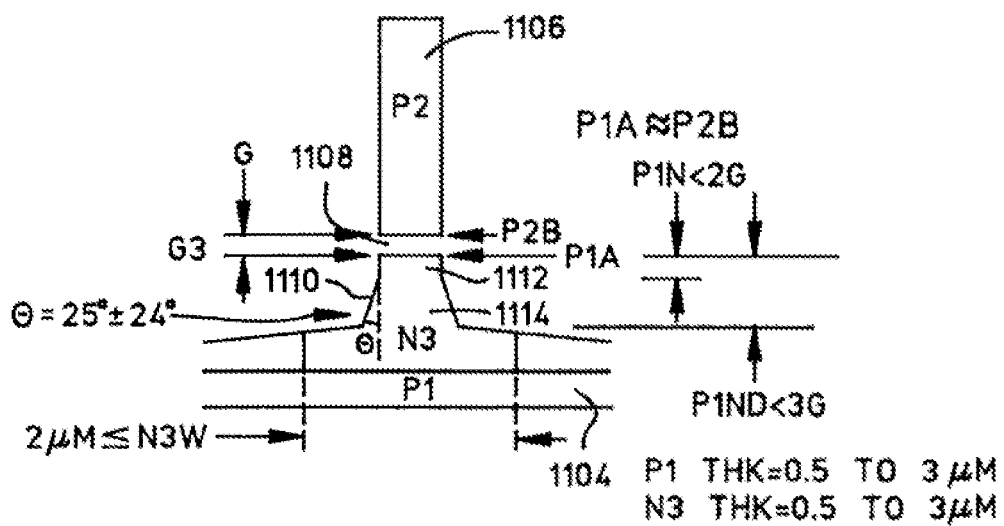
FIG. 11 is an ABS view of yet another prior art head formed with notches.
Figure 12:
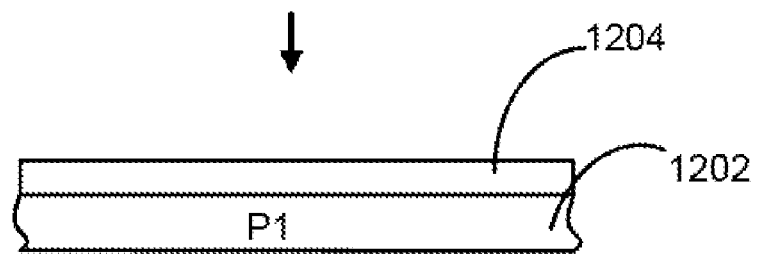
FIG. 12 is the first of a series of illustrations which are used to describe a method of making a magnetic write head in accordance with the present invention, which shows the formation of a first pole piece layer and a gap layer over the first pole piece layer.

FIG. 10 shows another conventional magnetic head 1002 which has a first pole piece 1004 and a second pole piece 1006 separated by a gap 1008. Between first pole piece 1004 and gap 1008 is a notched pedestal 1010, which resides on a raised and angled surface 1012 of first pole piece 1004. The surface 1012 is raised and angled due to the ion milling process to form the notches. Note that notched pedestal 1010 itself has "straight" side walls (i.e. side walls that are zero degrees relative to normal). FIG. 11 is another conventional magnetic head 1102 having a notched pole piece structure which is described in U.S. Patent Publication No. US 2003/0179498 A1 entitled "Magnetic Head Having A Notched Pole Piece Structure And Method Of Making The Same" by Inventors Hsiao et al. Magnetic head 1102 includes a first pole piece 1104 ("P1") and a second pole piece 1106 ("P2") separated by a gap 1108. Between first pole piece 1104 and gap 1108 is a central notched pedestal 1110 having angled side walls. By "angled," it is meant that the side walls slope outwardly at an angle greater than zero degrees (relative to normal). The angle at which the side walls slope is preferably 25 degrees, ±24 degrees. In decreasing order of generality, the angle may be 25 degrees±24 degrees; or 25 degrees±20 degrees; or 20 degrees±18 degrees; or 20 degrees±10 degrees; or between about 5-50 degrees. It has been observed that such angled side walls provide for an improved fringing field and overwrite capability as compared to the straight side walls of notched pedestal 1010 of FIG. 10. In this example, notched pedestal 1110 is formed of a top straight-walled portion 1112 having "straight" walls as well as a bottom angled-wall portion 1114 having the angled side walls. Below the bottom angled-wall portion 1114, bottom surfaces of notched pedestal 1110 have small outward downward slopes.

In the cross-referenced application having a U.S. patent application Ser. No. 10/881,782 filed on 30 Jun. 2004 entitled "Methods Of Making Magnetic Write Heads With Use of Linewidth Shrinkage Techniques", methods of making improved magnetic heads using linewidth shrinkage techniques are disclosed. During a baking process of an aqueous resist shrinking film, corrosion formation may be observed. This corrosion may hinder a plating process using high magnetic moment materials (e.g. $Ni_{22}Fe_{78}$) while forming the second pole piece. To help eliminate or substantially reduce the possibility of corrosion, the present application provides improved techniques with use of a resist channel shrinking solution made of a resist channel shrinking film and corrosion inhibitors.

Such an illustrative method of making a magnetic head will now be described in relation to FIGS. 12-21. Beginning with FIG. 12, a first pole piece layer 1202 ("P1") of a first pole piece is formed by electroplating materials over a substrate. First pole piece layer 1202 is made of a magnetic material, preferably one with a high magnetic moment, such as nickel-iron (NiFe), cobalt-iron (CoFe), or cobalt-iron-nitride (CoFeN). Next, a gap layer 1204 is subsequently deposited over first pole piece layer 1202. In one embodiment, gap layer 1204 is made of a non-magnetic electrically insulator material, such as alumina ($Al_2O_3$). If gap layer 1204 is made from a non-magnetic insulator material, then a metallic seed layer is necessary to facilitate the subsequent electroplating of second pole piece materials. Alternatively, gap layer 1204 is made of a non-magnetic metal. Examples of gap layer 1204 of the non-magnetic metal type include rhodium (Rh), nickel-phosphorous (NiP), chromium (Cr), gold (Au), and alloys thereof. Note that gap layer 1204 of this type may serve as a seed layer for the subsequent electroplating of the second pole piece, and a separate seed layer is not necessary.

Figure 13:
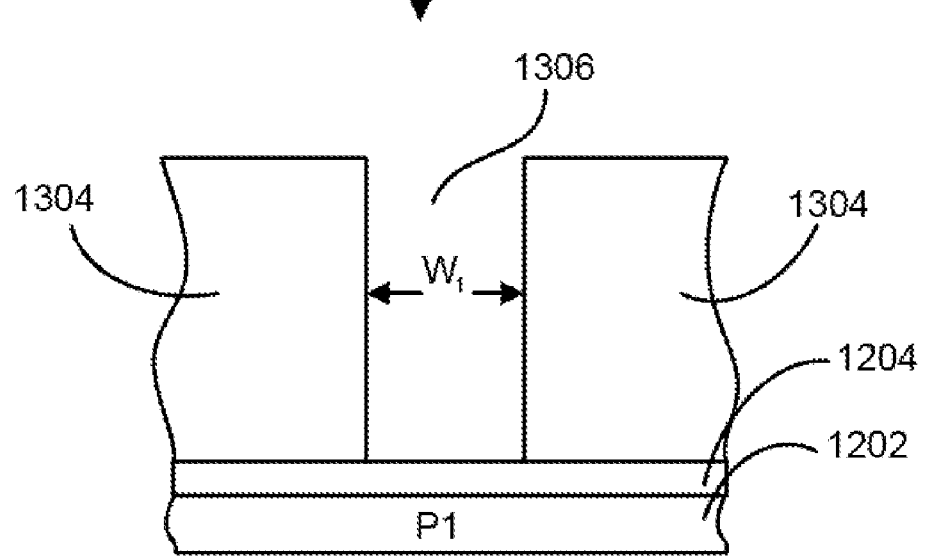
FIG. 13 is an illustration of that shown in FIG. 12 except that a patterned resist is formed over the first pole piece layer and the gap layer.

In FIG. 13, a patterned resist 1304 is formed over gap layer 1204 and first pole piece layer 1202. Preferably, patterned resist 1304 may be or include a photoresist such as a chemically-amplified resist; however a non-chemically-amplified resist may be suitable as an alternative. As shown, patterned resist 1304 is formed with a channel 1306 in a central region over gap layer 1204 and first pole piece layer 1202 using conventional lithography techniques. Channel 1306 within patterned resist 1304 is formed with a width that is identified as "$W_1$" in the drawing.

Figure 14:
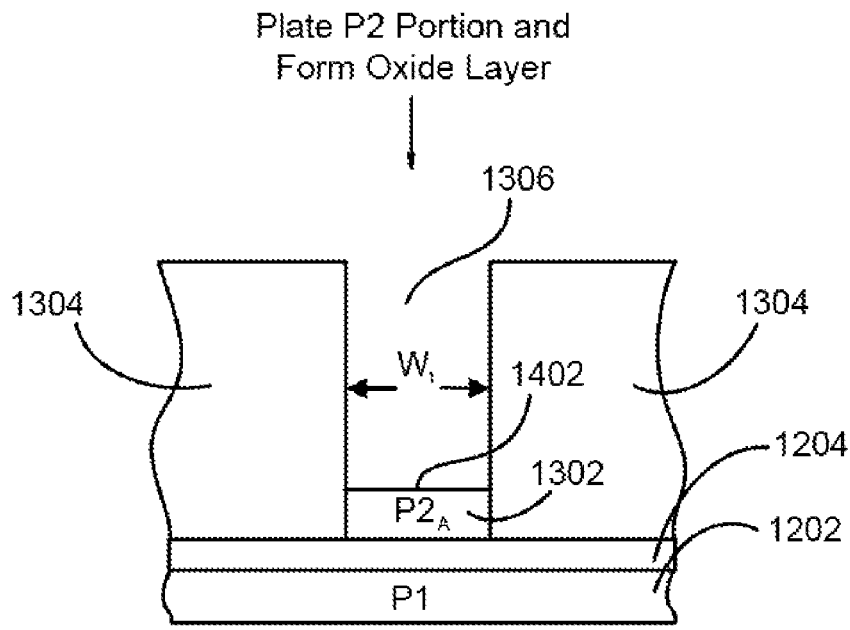
FIG. 14 is an illustration of that shown in FIG. 13 except that a first magnetic pedestal portion of a second pole piece is electroplated within a channel of the patterned resist.

In FIG. 14, a first pedestal portion 1302 ("$P2_A$") of a second pole piece is then electroplated over first pole piece layer 1202 and gap layer 1204 within channel 1306. First pedestal portion 1302 is made of a magnetic material, preferably one with a high magnetic moment, such as NiFe, CoFe, or CoFeN. NiFe may have multiple compositions (e.g. $Ni_xFe_{1-x}$) and, in the present embodiment, a high magnetic moment composition of $Ni_{22}Fe_{78}$ is preferable for optimized properties. First pedestal portion 1302 may be plated to a thickness between about 0.3-3.0 μm, and to a thickness of about 2 μm. The width of first pedestal portion 1302 (i.e. "$W_1$") is preferably between 0.3-0.5 μm. Next in FIG. 13, an oxygen plasma treatment is performed on first pedestal portion 1302 so as to form a thin oxide layer 1402 on top of first pedestal portion 1302. This is done in order to enhance the resistance to corrosion which may subsequently occur. Oxide layer 1402 may be formed to a thickness of between about 10 and 70 Angstroms.

Figure 15:
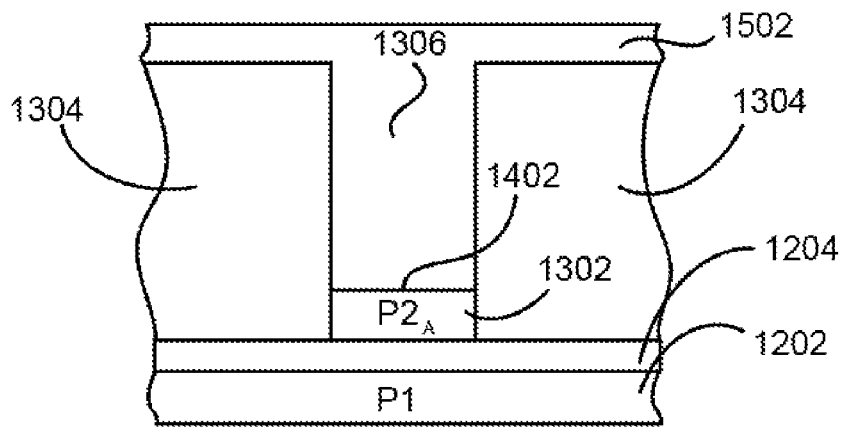
FIG. 15 is an illustration of that shown in FIG. 14 except that a resist channel shrinking solution having corrosion inhibitors is applied over the patterned resist.

In FIG. 15, a resist channel shrinking solution 1502 is then applied over the patterned resist 1304 and within channel 1306. Resist channel shrinking solution 1502 includes a resist channel shrinking film and corrosion inhibitors. In general, the resist channel shrinking film is or is based on any suitable film that assists in the shrinking of a channel or trench formed within a patterned resist. The corrosion inhibitors of resist channel shrinking solution 1502, along with oxide layer 1402, assist in eliminating or substantially reducing corrosion formation on structures formed within the channel or trench during a subsequent baking process.

Figure 23:
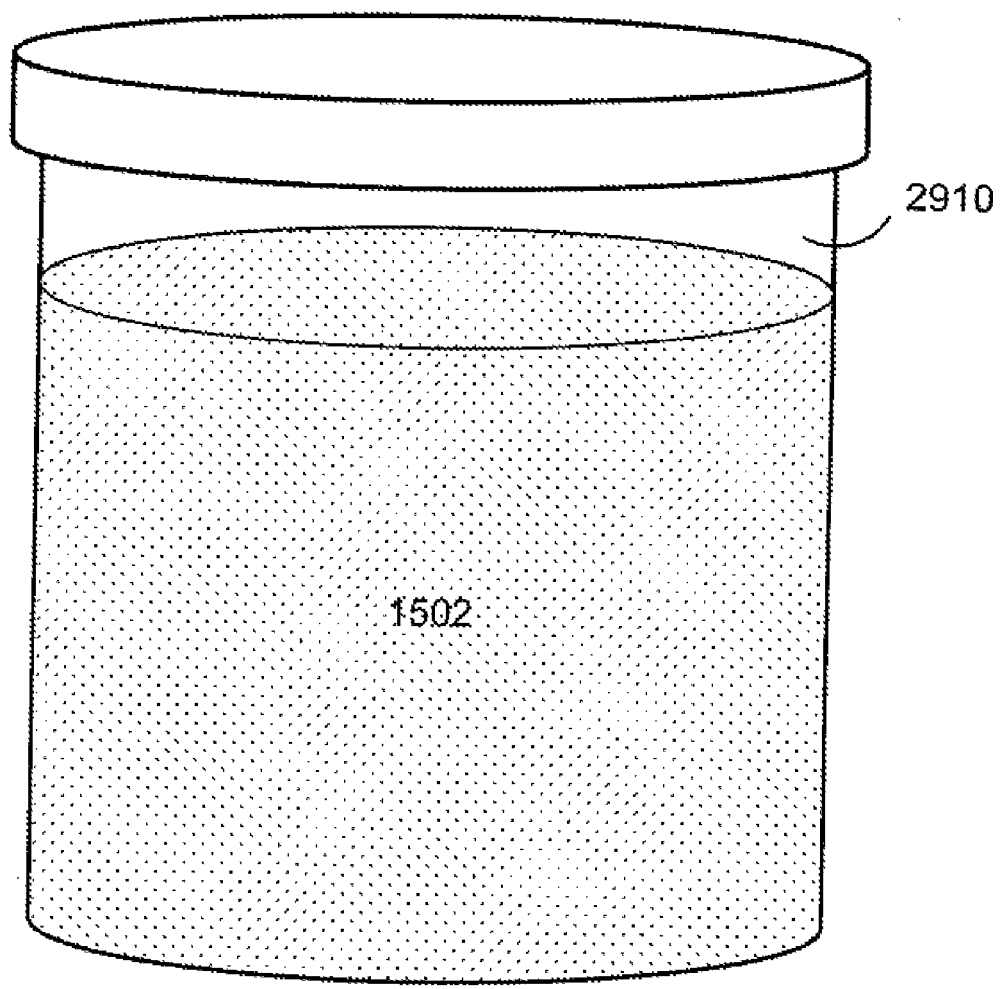
FIG. 23 is an illustration of a container having a resist channel shrinking solution comprising a resist channel shrinking film and corrosion inhibitors.

Referring ahead to FIG. 23, a container 2910 which contains resist channel shrinking solution 1502 is shown. The resist channel shrinking film within the solution 1502 may be or be based on a commercially-available film. For example, the resist channel shrinking film of solution 1502 may be the film provided by Tokyo Ohka Kogyo (TOK) Co., Ltd. in Kanagawa, Japan, which is today referred to as SAFIER™ (Shrink Assist Film for Enhanced Resolution) coating; for example, product FSC-9220 GM. SAFIER™ is a trademark of TOK Co., Ltd. Another suitable film is commercially available from Clariant Corporation of Muttenz, Switzerland, and referred to as a RELACS® (Resolution Enhancement Lithography Assisted by Chemical Shrinking) coating; product R-500 may be utilized, for example. RELACS is a registered trademark of the Clariant Corporation. These two resist channel shrinking films serve the same purpose of shrinking channel 1306 of patterned resist 1304 when baked, but the way in which these films achieve this result is different. Note that both of these films are aqueous solutions, water-soluble and removable by applying water after use.

The corrosion inhibitors of resist channel shrinking solution 1502 are preferably of the azole family of compounds. An azole is a class of five-membered nitrogen heterocyclic ring compounds containing at least one other non-carbon atom, nitrogen, sulfur or oxygen and two double bonds. The preferred corrosion inhibitor is 1,2,3-Benzotriazole (BTA). BTA is an odorless, white to tannish crystalline powder. It is sparingly soluble in water and soluble in a number of organic solvents. Some basic chemical properties of BTA include: $C_6H_5N_3$ (molecular formula); 119.14 (molecular weight); 350° C. (boiling point at 101.3 kPa); and 99° C. (melting point at 101.3 kPa).

Preferably, the corrosion inhibitors of resist channel shrinking solution 1502 make up approximately 0.4-1.5% of the total solution 1502 by weight. For example, resist channel shrinking solution 1402 may be made of the SAFIER film having 0.8% BTA. The corrosion inhibitors of resist channel shrinking solution 1502 help eliminate or substantially reduce corrosion upon or after baking. Specifically, the corrosion inhibitors of solution 1502 help eliminate or substantially reduce corrosion over first pedestal portion 1302 during the subsequent act of baking resist channel shrinking solution 1502. While BTA is the preferred corrosion inhibitor of this exemplary embodiment, any suitable corrosion inhibitor may be utilized alone or in combination with BTA, azole or otherwise. For example, a corrosion inhibitor named "RP1" made commercially available by NuGeneration Technologies, LLC (a.k.a. "NuGenTec") or Rohnert Park, Calif., U.S.A., may be utilized.

Figure 16:
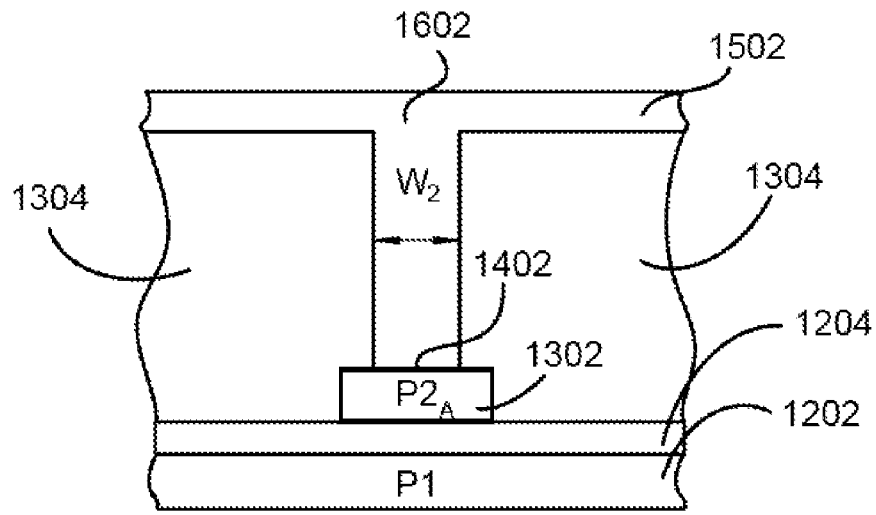
FIG. 16 is an illustration of that shown in FIG. 15 except that the resist channel shrinking solution having the corrosion inhibitors over the patterned resist is baked such that a reduced-width channel is formed.
Figure 17:
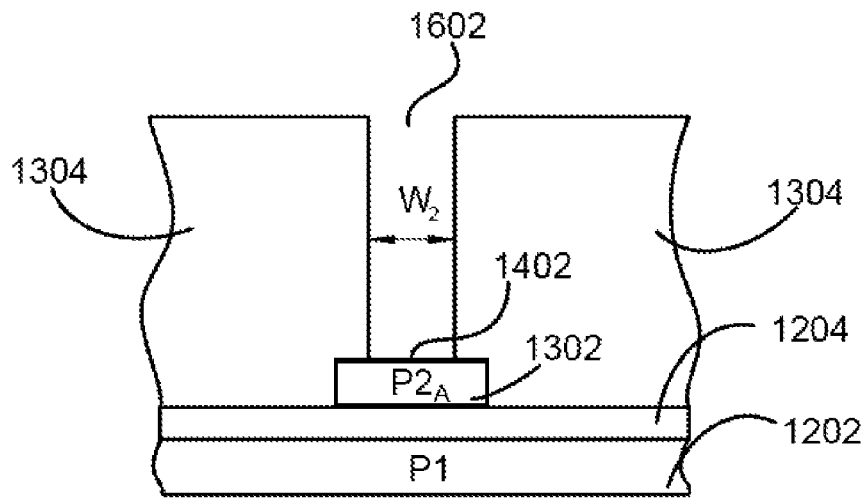
FIG. 17 is an illustration of that shown in FIG. 16 except that the resist channel shrinking solution having the corrosion inhibitors is removed.

Referring back to the method, and in particular to FIG. 16, resist channel shrinking solution 1502 which has been applied over patterned resist 1304 is baked. The baking process causes the channel within patterned resist 1304 to shrink to a reduced-width channel 1602. In FIG. 16, the width of reduced-width channel 1602 is represented as "$W_2$". The heating temperature and baking time is not limited to any particular values as long as the temperature is sufficiently high enough to cause thermal shrinkage of the channel. Preferably, the heat treatment may be performed within a temperature range of about 80-160° C. for 60-120 seconds. Also preferably, heating is performed so as to not cause excessive thermal fluidizing of patterned resist 1304. Using this process, each side of patterned resist 1304 within channel 1602 is extended proportionately such that channel 1602 is substantially centered with precision over pedestal 1302. Note that the widths of pedestal 1302 and gap layer 1402 are unaffected by the baking process and remain the same. The resist channel shrinking solution is subsequently removed by washing with water, and the resulting structure with the solution removed is shown in FIG. 17. Preferably, pure water is used in the wash for between about 30-120 seconds. Note also that the steps of applying the solution 1502 (FIG. 15), baking to reduce the width (FIG. 16), and washing may be repeated for further reductions in the width, as desired.

It is known that the reduced-width channel may be obtained in a few different ways. For example, the reduced-width channel may be produced by an expansion of the resist materials within the channel during the baking process (e.g. where the solution is to based on SAFIER film). Under the resulting force of thermal shrinkage of solution 1502 (see FIGS. 15 and 16), the dimensions of patterned resist 1304 in contact with solution 1502 will increase by an amount equivalent to the thermal shrinkage of solution 1502 and, as a result, patterned resist 1304 widens and accordingly the spacing within the channel lessens. The spacing within the channel determines the diameter or width of the patterned element to be finally obtained; the decrease in the spacing within the channel contributes to reducing the diameter of the element. Alternatively, the reduced-width channel may be produced by a growth of materials within the channel during the baking process (e.g. where the solution is based on RELACS film). After exposure and development of the photoresist used to produce the patterned resist, acids are released from sidewalls within the channel of the patterned resist. These acids diffuse within the resist channel shrinking solution formed thereover, resulting in a cross-linking and growth of thin layers around the sidewalls. This produces a reduction in width of the channel. As another alternative, the reduced-width channel may be produced by a combination of an expansion of the resist materials within the channel (e.g. SAFIER) and a growth of materials within the channel (e.g. RELACS).

Note that, in steps of FIG. 15-17, other alternative channel shrink techniques known to those skilled in the art may be utilized. Examples of these include reflow processes, Chemical Amplification of Resist Lines (CARL) processes, and Water-Soluble Organic Overcoating Material (WASOOM) processes. See e.g. K. Aramaki, T. Hamada, D. K. Lee, H. Okazaki, N. Tsugama, G. Pawlowski, "Techniques to Print sub-0.2 μm Contact Holes," SPIE 3999, pages 738-749 (2000); J. Kim, C. Choi, M. Kim, C. Bok, H. Kim, K. Baik, "Implementation of Sub-150 nm Contact Hole Pattern by Resist Flow Process," Journal of Applied Physics 37, pages 6863-6868 (1998); and J. Chun, S. Bakshi, S. Barnett, J. Shih, SK. Lee, "Contact Hole Size Reducing Methods by using Water-Soluble Organic Overcoating material (WASOOM) as a barrier layer toward 0.15 μm: Resist flow Technique I," SPIE 3999, pages 620-626 (2000).

Figure 18:
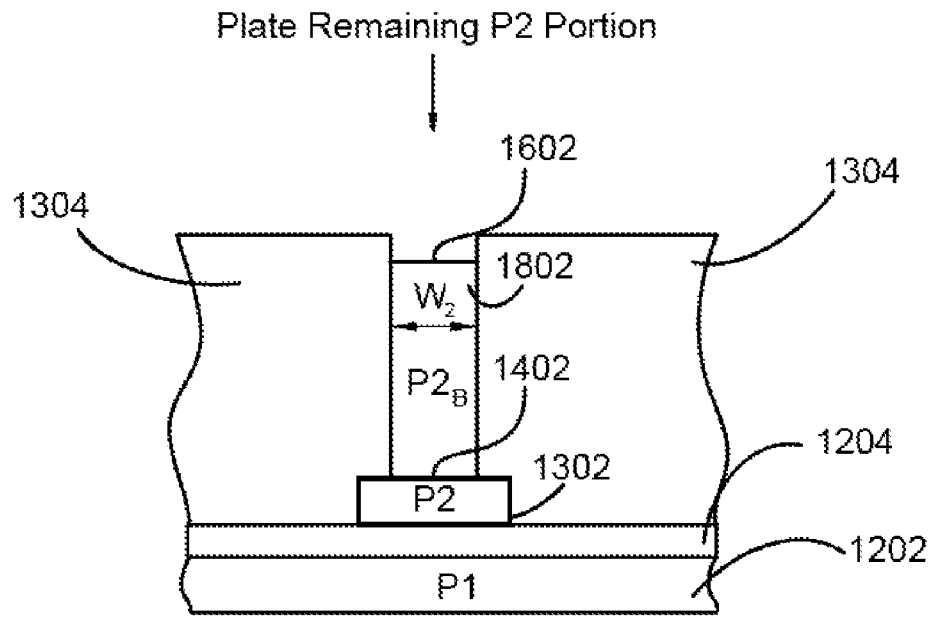
FIG. 18 is an illustration of that shown in FIG. 17 except that a second magnetic pedestal portion of the second pole piece is electroplated within the reduced-width channel.
Figure 19:
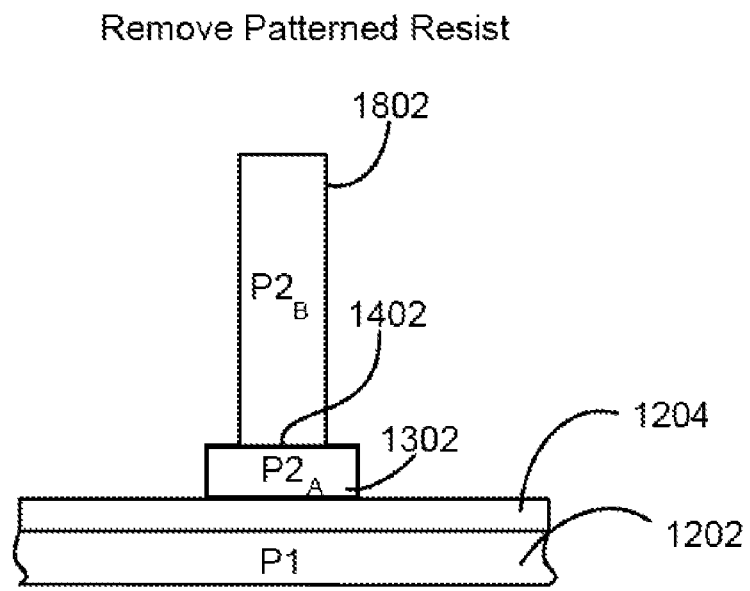
FIG. 19 is an illustration of that shown in FIG. 18 except that the patterned resist is removed.

Referring next to FIG. 18, a second pedestal portion 1802 ("$P2_B$") of the second pole piece is then electroplated over first pedestal portion 1302 (i.e. on top of oxide layer to 1402) within reduced-width channel 1602. Second pedestal portion 1802 is made of a magnetic material, preferably one with a high magnetic moment such as NiFe (e.g. specifically $Ni_{22}Fe_{78}$), CoFe, or CoFeN. The width of second pedestal portion 1802 may be formed to anywhere between about 0.2-0.5 microns, such as about 0.3 microns, but will be reduced in size from a subsequent ion milling process for notching (described later below). Since reduced-width channel 1602 was centered with precision over first pedestal portion 1302, second pedestal portion 1802 is centered with precision over first pedestal portion 1302. This self-alignment greatly improves the subsequent notching process described below. The patterned resist 1304 is then removed with use of a suitable solvent, and the resulting structure with the removed resist is shown in FIG. 19.

Figure 20:
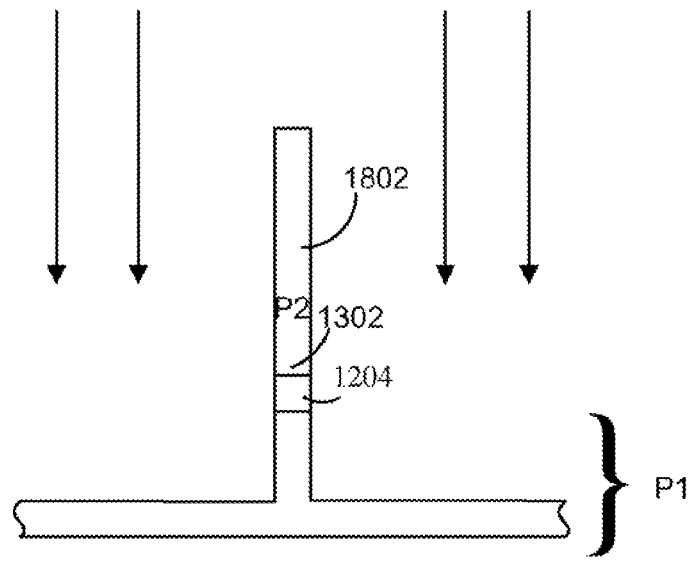
FIG. 20 is an illustration of that shown in FIG. 19 except that an ion milling on the pedestal has been performed, using the second pole piece as a mask, to form a central notched pedestal having side walls with straight or angled slopes.
Figure 21:
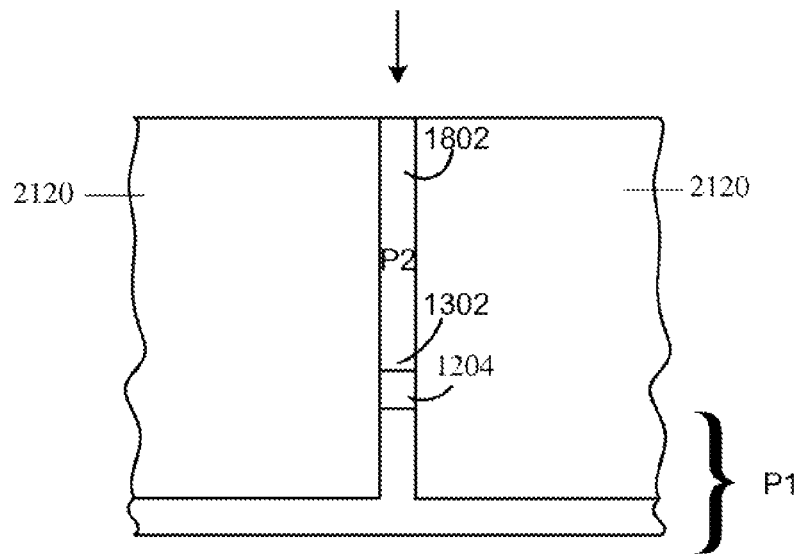
FIG. 21 is an illustration of that shown in FIG. 20 except that insulator materials are deposited around the first and second pole pieces.

First pedestal portion 1302 is then notched by an ion milling process using second pedestal portion 1802 as a milling mask, and the etching is continued through the gap and first pole piece materials. One result is shown in the structure of FIG. 20. With the notching and trimming process, the entire second pole piece gradually shrinks in size (e.g. width) during the ion milling. The notching is performed at least until first and second pole tips are formed and have the same width. In this embodiment, the first pedestal portion is formed to have straight walls as shown. However, an angle on each side wall may be formed to be about 25 degrees±24 degrees relative to normal. More particularly, each side wall may be angled at least 5 degrees relative to normal within these bounds. The resultant width for the second pole piece after such ion milling, which helps define the trackwidth, may be between about 0.05-0.2 micrometers. After the notching process, other processing steps depicted in FIG. 21 may be performed such as depositing insulator materials 2120 (e.g. alumina) around the pole pieces and performing a planarization process such as a chemical-mechanical polish (CMP) to form a top planarized surface over the structure.

Figure 22:
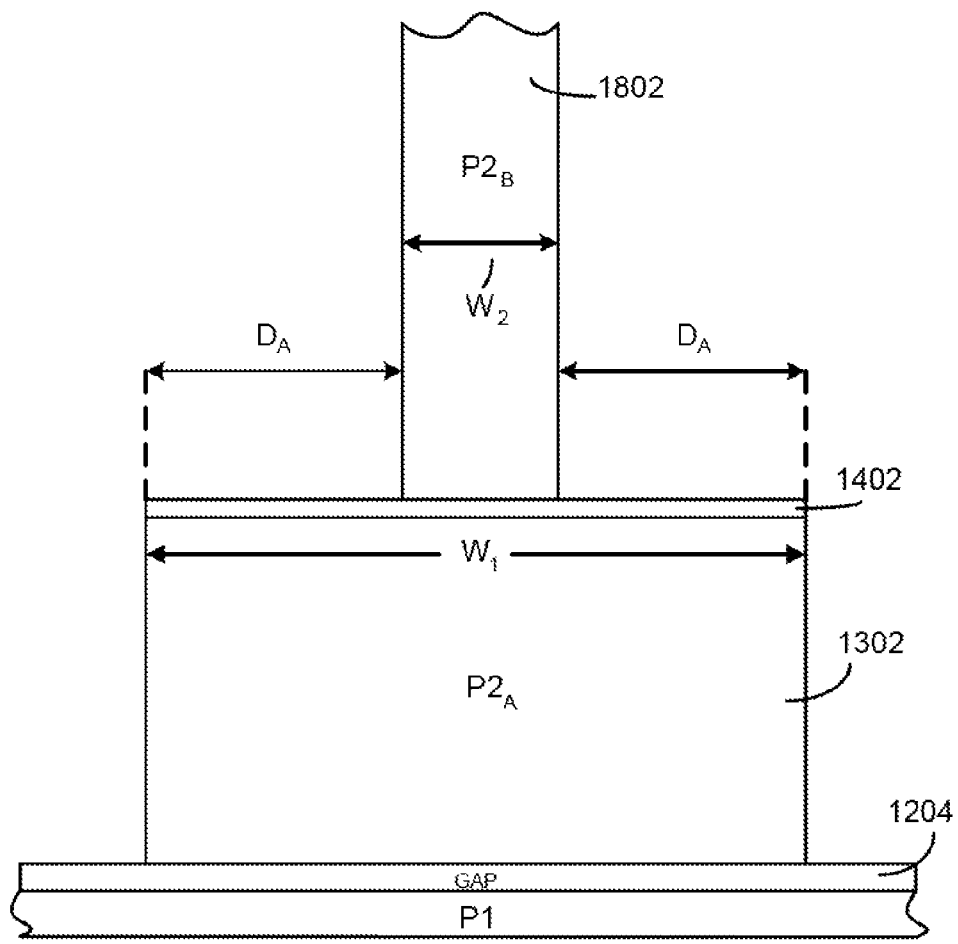
FIG. 22 is a close-up view of the second magnetic pedestal portion being centered with precision relative to the underlying first magnetic pedestal portion.

Since the second pedestal portion of the second pole piece was precisely centered over the first pedestal portion, the notching may be performed so as to form a substantially symmetric structure. When the structure is appropriately formed and is substantially symmetric, the magnetic head has suitable overwrite (OW) properties and shows little if any adjacent track interference (ATI) problems. A precise centering of the second pole piece is depicted in more detail in FIG. 22. FIG. 22 corresponds to the structure in the step previously shown in relation to FIG. 19. In FIG. 22 it is shown that the leftmost edge of second pedestal portion 1802 and the leftmost edge of first pedestal portion 1302 are separated by a distance $D_A$, and the rightmost edge of second pedestal portion 1802 and the rightmost edge of first pedestal portion 1302 are separated by a distance $D_B$. Ideally, $D_A=D_B$, or $D_A-D_B=0$. More realistically, from the precise centering of second pedestal portion 1802 relative to first pedestal portion 1302, $D_A+D_B \leq 0.3$ microns and $|D_A-D_B| \leq 0.2$ microns. The width of first pedestal portion 1302 ("$W_1$" in FIG. 28) minus the width of second pedestal portion 1802 ("$W_2$" in FIG. 28) may be as small as 0.2 microns. If $W_1-W_2 \leq 1$ micron, then a steep notched pedestal can be achieved with much less consumption of second pedestal portion 1802 during the ion null. A magnetic head having a thicker resulting second pedestal portion 1802 tends to have better OW performance.

Final Comments. Thus, methods of making magnetic write heads based on linewidth shrinkage techniques with use of a resist channel shrinking solution have been described. The resist channel shrinking solution of the present application is made of a resist channel shrinking film and corrosion inhibitors. One preferred method for use in making the magnetic head includes the steps of forming a first pole piece layer of a first pole piece; forming a gap layer over the first pole piece layer; forming a patterned resist over the first pole piece layer and the gap layer; electroplating a first pedestal portion of a second pole piece over the gap layer within a channel of the patterned resist; applying the resist channel shrinking solution over the patterned resist; baking the resist channel shrinking solution over the patterned resist to thereby reduce a width of the channel; removing the resist channel shrinking solution; electroplating a second pedestal portion of the second pole piece within the reduced-width channel of the patterned resist; and removing the patterned resist. A step of forming an oxide layer over the first pedestal portion may be performed prior to the step of baking. Advantageously, the reduction in channel width using a resist channel shrinking solution provides for self-alignment of a structure which can be symmetrically notched for improved overwrite (OW) properties and reduced adjacent track interference (ATI). The corrosion inhibitors of the resist channel shrinking solution help reduce corrosion in the pole piece during the act of baking the resist channel shrinking solution. The corrosion inhibitors of the solution may be based on, for example, an azole (e.g. 1-2-3-Benzotriazole or BTA) and comprise 0.4-1.5% of the solution by weight. Advantageously, high magnetic moment materials may be utilized in the magnetic write head as desired. More generally, a method for use in making a device structure includes the steps of forming, within a channel of a patterned resist, a first pedestal portion; applying, within the channel of the patterned resist, a resist channel shrinking solution comprising a resist channel shrinking film and corrosion inhibitors; and baking the resist channel shrinking solution over the patterned resist to thereby reduce a width of the channel of the patterned resist. The method may further include the steps of removing the resist channel shrinking solution and forming a second pedestal portion within the reduced-width channel of the patterned resist.

It is to be understood that the above is merely a description of preferred embodiments of the invention and that various changes, alterations, and variations may be made without departing from the true spirit and scope of the invention as set for in the appended claims. Although the description supports specific techniques for fabricating a magnetic write head, the method may be applied more generally to the fabrication of device structures in a magnetic head, or other device structures in integrated circuits or Micro-Electro-Mechanical Systems (MEMS), for example. Few if any of the terms in the specification and claims have been given any special particular meaning different from their plain language meaning, and therefore the specification is not to be used to define terms in an unduly narrow sense.

What is claimed is:

1. A method for use in forming a device structure, the method comprising:
   forming, within a channel of a patterned resist, a first pedestal portion;
   forming an oxide layer over the first pedestal portion;
   applying, within the channel of the patterned resist, a resist channel shrinking solution comprising a resist channel shrinking film and corrosion inhibitors; and
   baking the resist channel shrinking solution over the patterned resist, to thereby reduce a width of the channel above the first pedestal portion.

2. The method of claim 1, further comprising:
   removing the resist channel shrinking solution; and
   forming a second pedestal portion within the reduced-width channel of the patterned resist.

3. The method of claim 1, wherein the oxide layer and the corrosion inhibitors of the resist channel shrinking solution reduce corrosion formation during the act of baking, the method further comprising:
   removing the resist channel shrinking solution; and
   forming a second pedestal portion within the reduced-width channel of the patterned resist.

4. The method of claim 1, wherein the device structure is a magnetic head.

5. A method for use in making a device structure, the method comprising:
   forming, within a channel of a patterned resist, a first pedestal portion;
   forming an oxide layer over the first pedestal portion;
   applying, within the channel of the patterned resist, a resist channel shrinking solution comprising a resist channel shrinking film and corrosion inhibitors;
   baking the resist channel shrinking solution over the patterned resist to thereby reduce a width of the channel of the patterned resist;
   removing the resist channel shrinking solution; and
   forming a second pedestal portion within the reduced-width channel of the patterned resist.

6. The method of claim 5,
   wherein the device structure is a magnetic head.

7. The method of claim 6, further comprising:
   wherein the first and the second pedestal portions help form part of a second pole piece of the magnetic head;
   removing the patterned resist; and
   milling the first pedestal portion, using the second pedestal portion as a mask, for forming a write head structure of the magnetic head.

8. The method of claim 7, wherein the second pole piece comprises nickel-iron ($Ni_{22}Fe_{78}$).

9. The method of claim 5, wherein the corrosion inhibitors comprise 0.4-1.5% of the resist channel shrinking solution by weight.

10. The method of claim 5, wherein the corrosion inhibitors of the resist channel shrinking solution comprise an azole.

11. The method of claim 5, wherein the first and the second pedestal portions comprise part of a second pole piece, the method further comprising:
    prior to forming the first pedestal portion, forming a first pole piece layer of a first pole piece; and
    forming a gap layer over the first pole piece layer.

12. The method of claim 11, wherein the gap layer comprises one of a non-magnetic insulator and a non-magnetic metal.

13. The method of claim 5, wherein the acts of forming comprise electroplating the first and the second pedestal portions.

14. The method of claim 5, wherein the oxide layer and the corrosion inhibitors of the resist channel shrinking solution reduce corrosion formation during the act of baking.

15. The method of claim 5, wherein the corrosion inhibitors of the resist channel shrinking solution reduce corrosion formation during the act of baking.

16. The method of claim 5, wherein the device structure is a magnetic head.

* * * * *